(12) United States Patent
Baset et al.

(10) Patent No.: US 8,972,963 B2
(45) Date of Patent: Mar. 3, 2015

(54) END-TO-END PATCH AUTOMATION AND INTEGRATION

(75) Inventors: Salman A. Baset, Hawthorne, NY (US); Rajesh Garg, Bangalore (IN); Ashu Gupta, Andhra Pradesh (IN); Hai Huang, Hawthorne, NY (US); Mohamed Fazal Mohamed Feroze, Chennai (IN); Sumithra Ravichandran, Chennai (IN); MadhuSudhan Kagalavadi Ningaiah, Karnataka (IN); Chunqiang Tang, Hawthorne, NY (US); Mahesh Viswanathan, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/432,889

(22) Filed: Mar. 28, 2012

(65) Prior Publication Data

US 2013/0263104 A1    Oct. 3, 2013

(51) Int. Cl.
*G06F 9/44* (2006.01)
(52) U.S. Cl.
USPC .......................................................... 717/168
(58) Field of Classification Search
CPC ................... G06F 8/70; G06F 8/68
USPC ............................................... 717/129, 168
See application file for complete search history.

(56) References Cited

U.S. PATENT DOCUMENTS

| | | | | |
|---|---|---|---|---|
| 7,748,000 | B2* | 6/2010 | Genty et al. | 717/176 |
| 2006/0080656 | A1* | 4/2006 | Cain et al. | 717/174 |
| 2007/0033586 | A1* | 2/2007 | Hirsave et al. | 717/174 |
| 2007/0100892 | A1* | 5/2007 | Kephart et al. | 707/200 |
| 2007/0226728 | A1* | 9/2007 | Thorson et al. | 717/168 |
| 2008/0235678 | A1* | 9/2008 | Bantz et al. | 717/171 |
| 2008/0263534 | A1* | 10/2008 | Hirsave et al. | 717/168 |
| 2011/0061082 | A1* | 3/2011 | Heo et al. | 725/87 |
| 2013/0263104 | A1* | 10/2013 | Baset et al. | 717/168 |

OTHER PUBLICATIONS

Altiris, Altiris patch Management Solution 7.0 from Symantec for Windows Release Notes, Symantec (Mar. 5, 2009) retrieved from http://www.symantec.com/business/support/index?page=content&id=DOC1491 on Dec. 29, 2013.*

Maintenance Window, Configuring Maintenance Window Policies, Symantec (Mar. 18, 2011) retrieved from http://www.symantec.com/business/support/index?page=content&id=HOWTO45372 on Dec. 29, 2013.*

Potter et al., Reducing Downtime Due to System Maintenance and Upgrades, 19th Large Installation System Administration Conference (LISA 2005), Applicant Provided Art.*

(Continued)

*Primary Examiner* — Don Wong
*Assistant Examiner* — Theodore Hebert
(74) *Attorney, Agent, or Firm* — F. Chau & Associates, LLC; Louis J. Percello

(57) ABSTRACT

A method of automating patching of a computer system includes determining whether a computer patch is available for a computer system of a customer, determining a patch management policy of the customer, determining a patch window of the customer based on the determined patch management policy, and directing application of the computer patch to the computer system at the determined patch window.

23 Claims, 14 Drawing Sheets

(56) References Cited

OTHER PUBLICATIONS

Policy, How to export/import an existing Symantec Endpoint Protection Policy, Symantec (Jan. 5, 2008) retrieved from http://www.symantec.com/business/support/index?page=content&id=TECH106486 on Jun. 24, 2014.*

Mark E. Segal, et al., "Dynamically Updating Distributed Software: Supporting Change in Uncertain and Mistrustful Environments", IEEE Conference on Software Maintenance, Oct. 1989.

L.A. Tewksbury, et al., "Live Upgrades of CORBA Applications Using Object Replication", In International Conference on Software Maintenance, Florence, Italy, Nov. 2001.

Wu Zhou, et al., "Always Up-to-date—Scalable Offline Patching of VM Images in a Compute Cloud", In Proceedings of the 26th Annual Computer Security Applications Conference, Austin, TX 2010.

Alan Choi, "Online Application Upgrade Using Edition-Based Redefinition", In ACM Workshop on Hot Topics in Software Upgrades, Oct. 2009.

Tudor Dumitras, et al., "To Upgrade or Not to Upgrade: Impact on Online Upgrades across Multiple Administrative Domains", Onward, Oct. 2010.

Jeff Arnold, et al., "Ksplice: Automatic Rebootless Kernel Updates", Eurosys. 2009.

David E. Lowell, et al., "Devirtualizable Virtual Machines Enabling General, Single-Node, Online Maintenance", Proceedings of the 11th International Conference on Architectural Support for Programming Languages and Operating Systems, USA 2004.

Shaya Potter, et al., "Reducing Downtime Due to System Maintenance and Upgrades", 19th Large Installation System Administration Conference (LISA '05), San Diego, CA.

Olivier Crameri, et al., "Staged Deployment in Mirage, an Integrated Software Upgrade Testing and Distribution System", In Symposium on Operating Systems Principles, Oct. 2007.

* cited by examiner

| Customer | Severity | Start |
|---|---|---|
| customerx | low | last Sunday of every quarter at 9pm |
| customerx | med | last Wednesday of every quarter at Midnight |
| customerx | high | last Saturday of every month at 11pm |

201

| Customer | Category | Offset |
|---|---|---|
| customerx | test | +0 day |
| customerx | dev | +1 week |
| customerx | prod | +2 weeks |

202

| Customer | Exception |
|---|---|
| customerx | MS10-081 |
| customerx | MS10-082 |
| customerx | MS11-035 |

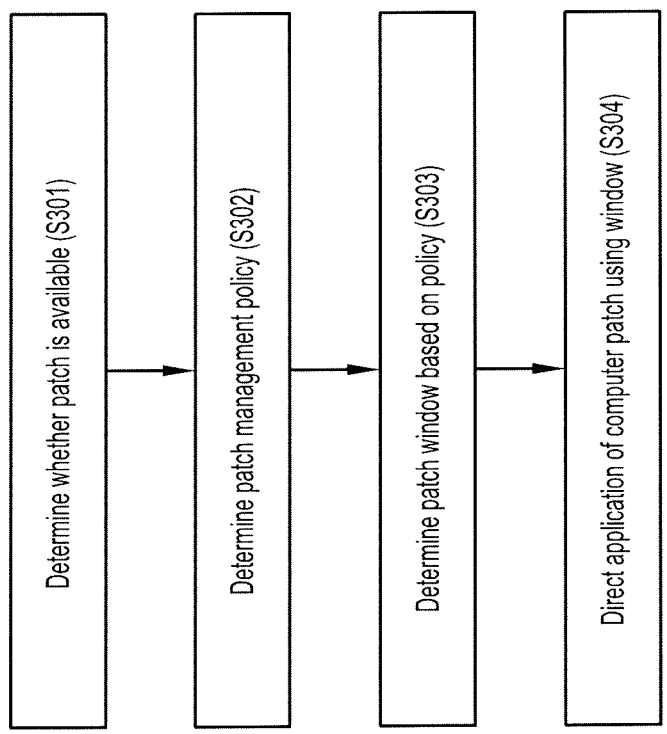

END-TO-END PATCH AUTOMATION AND INTEGRATION

BACKGROUND

1. Technical Field

The present disclosure relates generally to patching computer systems, and more particularly to automating the patching of computer systems.

2. Discussion of Related Art

A computer software patch is a piece of software that is designed to fix problems with a computer program. For example, the patch may be used to correct security vulnerabilities, correct a programming bug (error), improve existing functions, or change software behavior of the computer program. Patches may be applied to a hypervisor, an operating system, middleware, and various other computer software applications.

BRIEF SUMMARY

According to an exemplary embodiment of the invention, a method of automating patching of a computer system includes determining whether a computer patch is available for a computer system of a customer, determining a patch management policy of the customer, determining a patch window of the customer based on the determined patch management policy, and directing application of the computer patch to the computer system at the determined patch window.

According to an exemplary embodiment of the invention, a computer system to provide automated patching includes a processor and a memory. The memory stores an interface application programming interface, a patching automation program, and at least one customer patching policy. The interface application programming interface includes first interface routines to communicate with an external patch notification server and second interface routines to communicate with an external patching server. The patching automation program uses the first interface routines to determine whether a patch is available for a computer of a customer and the second interface routines to apply the patch to the computer based on the customer patching policy of the customer.

According to an exemplary embodiment of the invention, a method of applying a patch to one of a plurality of virtual machines includes determining whether a computer patch is available for one of the virtual machine that is provisioned to a customer, retrieving a digital watermark from the one virtual machine including a category, determining an initial patch window based on a patch severity of the computer patch, determining an offset time based on the category, and applying the patch to the virtual machine at a patch window based on the initial patch window and the offset time.

According to an exemplary embodiment of the invention, a method of applying a patch to one of a plurality of virtual machines includes determining whether a computer patch is available for one of the virtual machine that is provisioned to a customer, retrieving a digital watermark from the one virtual machine including a category, determining an initial patch window based on a patch severity of the computer patch, determining an offset time based on the category, and applying the patch to the virtual machine at a patch window based on the initial patch window and the offset time.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 2 illustrates exemplary tables that may be used to form a customer patch management policy.

FIG. 3A illustrates a method of applying a patch according to an exemplary embodiment of the invention.

DETAILED DESCRIPTION

Figure 1A:
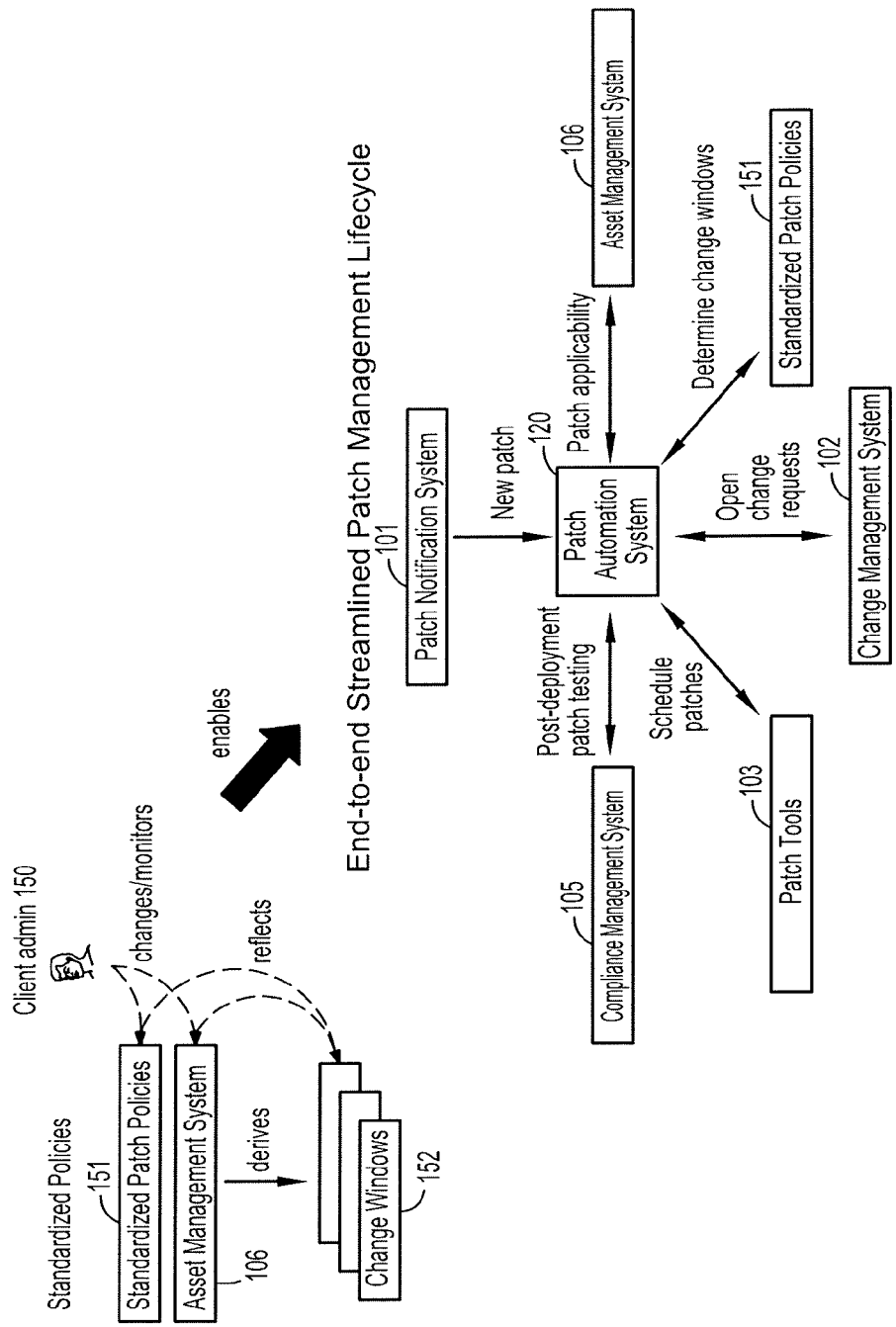
FIG. 1A illustrates a lifecycle of an end-to-end patch management system according to an exemplary embodiment of the invention.

At least one embodiment of the invention was made in an effort to improve and automate patch management. Patch management may include phases such as notification, scheduling, deployment, and post-deployment.

In the notification phase, when new patches are released by vendors, their availability is then detected by either subscribing to a vendor notification system or manually checking patch bulletins periodically. For each new patch, a patch advisory system is responsible for notifying system administrative teams whose managed assets are affected so that the patch can be scheduled, applied, and tested in the least intrusive manner and timeframe. A patch advisory system is also used to keep track of the lifecycle of a patch. For example, the system may indicate whether a patch has succeeded or failed, on which endpoints the patch was applied, who has done the work, what time the work was done, and was the customer notified if a patch was not applied on time.

In the scheduling phase, various parties such as the system administrator, support teams, application owners, and customers are notified of the new patch. A change management system is used for various teams to negotiate on what systems will be patched, at what time the patch will be applied, on exceptions that should be made, etc. Information exchange and negotiation between multiple teams may result in unavoidable wait times. For example, some of the team members may be located in different geographic locations with different time zones. Thus, back-and-forth exchanges between the team members can cause a routine change to be delayed.

In the deployment and post-deployment phase, actions agreed upon in the previous phase will be executed by the delivery teams to coordinate the efforts. For example, when an operating system patch is to be applied, an application team will typically need to shutdown the running applications and middleware to avoid data corruption and other potential inconsistency problems. When the patch is completed, various health checking tasks and regression tests are performed to verify that the applied changes did not adversely impact anything.

Typically, a human being is involved in each of the above phases in some fashion. Thus, patch management may be improved by removing human involvement from at least one of the phases and only involving human operators to handle complicated problems or exceptions that are difficult to automate.

In at least one embodiment of the invention, a patch automation engine is configured with one of a plurality of standardized patch scheduling policies so it can apply the one that was agreed to by the customer (e.g., at contract time) to a given patch. The policy semantic is general enough that it can capture many different business needs, but is still flexible enough that customers can request for exceptions as the need arises. This allows an automated solution to perform tasks based on the agreed upon policy, and when the customer's needs change, it will adjust its actions accordingly.

Examples of parameters that customers can use to define the patch scheduling policy are patch severity and virtual machine category. Patching causes downtime, and a customer can use patch severity to balance between the amount of downtime due to patching and the benefits of applying a patch. Example patching policies include policies that apply low and medium severity patches every 3 months and high severity patches every month. Orthogonal to patch severity, a customer can also put virtual machines into different categories (e.g., Test, Development, and Production). In this way, a patch can be scheduled to VMs of different categories in a staged fashion to minimize the chance that a problematic patch is propagated to production machines.

FIG. 1A shows how standardized patch policies can be used to generate a system for end-to-end patch management according to an exemplary embodiment of the invention. For example, a client administrator 150 or other party can select one standardized patch policy 151 for each customer. Patch change windows 152 can then be derived for each customer.

Referring to FIG. 1A, a Patch Notification System/Server 101 notifies a Patch Automation System 120 of a new patch. The Patch Automation System 120 can determine whether the patch is applicable to the customer based on information from the Asset Management System 106. The System 120 may be run in a Cloud ComputingEnvironment. If the patch is applicable to a particular customer, the patch change window 152 for a computer or virtual machine of the customer can be derived from the patch policy 151 of the customer and potentially information gathered from the Asset Management System 106 or a Provisioning Manager 106.

The Patch Automation System 120 can then open up a change request on the Change Management System/server 102 indicating that the patch will be applied at the derived patch window 152. The Patch Automation System 120 can schedule that the patch be applied at the patch window 152 by interfacing with a Patch Tool or a Patching server 103, which will apply the patch at the given window.

Once the patch has been applied, the Patch Automation System 120 can perform post-deployment testing to determine whether the patch was successfully installed. The Parch Automation System 120 can then notify a Compliance Management System or a Quality server 105 that the patch was successfully installed or failed to install properly.

Figure 1B:
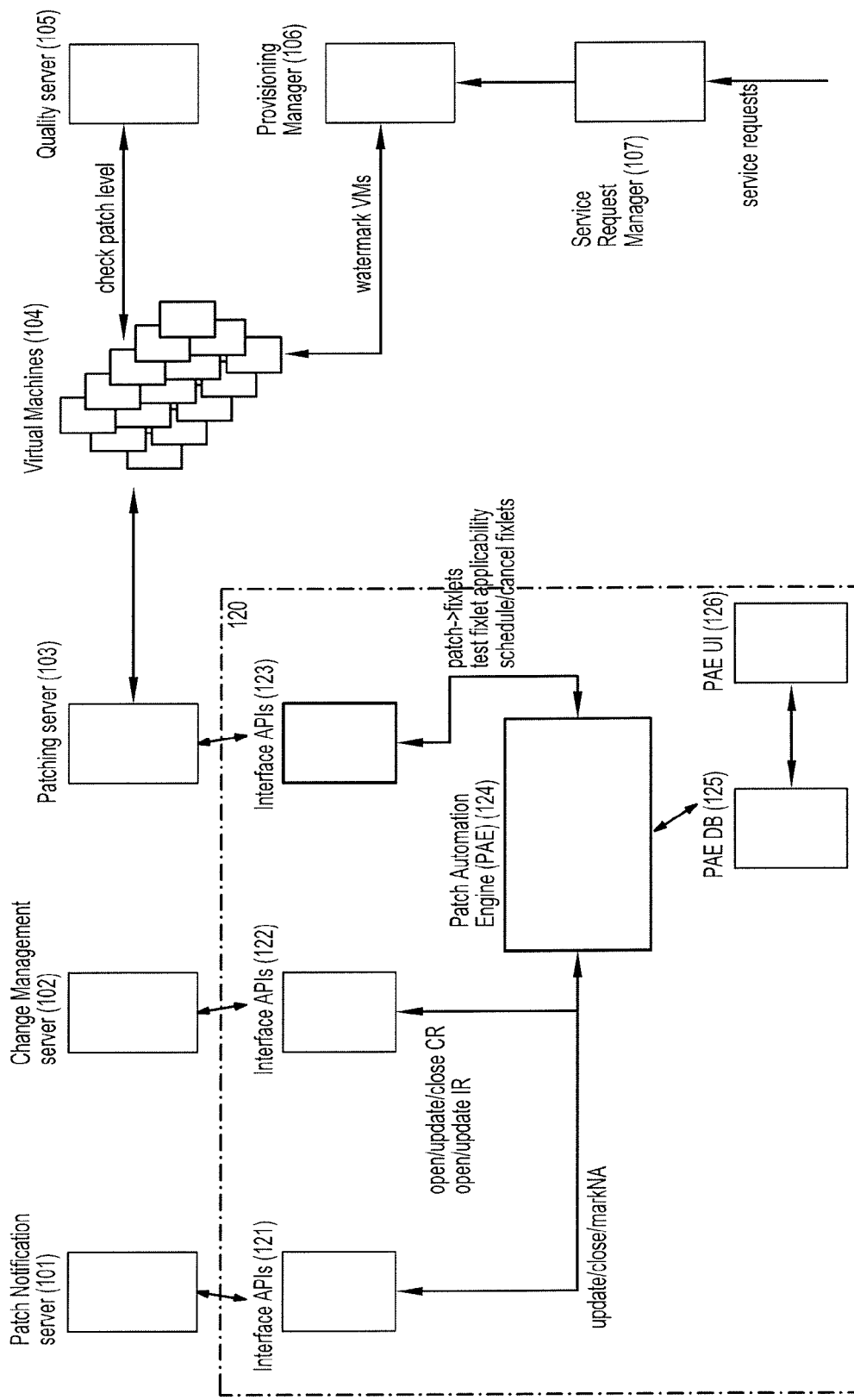
FIG. 1B illustrates a system for an end-to-end patch management according to another exemplary embodiment of the invention.

FIG. 1B shows a system for end-to-end patch management according to another exemplary embodiment of the invention. The system includes the Patch Notification server 101, the Change Management server 102, the Patching server 103, at least one virtual machine(s) 104, the Quality server 105, the Provisioning Manager 106, a Service Request manager 107, and the Patch Automation System 120.

The Patch Automation System 120 includes first application programming interfaces 121 for interfacing with the Patch Notification server 101, second application programming interfaces 122 for interfacing with the Change Management server 102, third application programming interfaces 123 for interfacing with the Patching server 103, a Patch Automation Engine (PAE) 124, a Patch Automation Engine (PAE) database 125, and a Patch Automation Engine (PAE) User Interface (UI) 126.

In an exemplary embodiment, the Patch Notification server 101 is a Compliance, Issue, Risk and Authorized Program Analysis Report (APAR) Tracking System (CIRATS) server from the IBM Corporation. In an exemplary embodiment, the Change Management server 102 is a server that runs the Integrated Service Management ISM program, the Patching server 103 is the Tivoli Endpoint Manager (TEM), the Provisioning Manager 106 is the Tivoli Provisioning Manager, and the Service Request Manager 107 is the Tivoli Service Request Manager (TSRM), which are all computer programs created by from the IBM Corporation. However, embodiments of the invention are not limited thereto. For example, any one of the Patch Notification server 101, the Change Management Server 102, the Patching server 103, the Quality server 105, the Provisioning Manager 106, or the Service Request Manager 107 may be replaced with programs from other manufacturers. Further, even though FIG. 1B illustrates various different servers or managers, the functions of the listed servers or managers may be combined into fewer numbers of servers or managers.

The PAE 124 is configured to communicate with various tools using various interfaces (e.g., 121-123) implemented by or compatible with individual tools (e.g., 101-103) to allow the PAE 124 to orchestrate a patch management workflow from start to end across different management tools. For example, the PAE 124 can use Platform and SOAP APIs (e.g., 123) implemented by the Patching server 103 to communicate with the Patching server 103 and SOAP APIs (e.g., 122) implemented by the Change Management Server 102 to communicate with the Change Management Server 102.

The first interface APIs 121 enables the PAE 124 to interface with the Patch Notification server 101 to determine the patch that should be applied to each of the virtual machines 104. The Patch Automation System 120 may include additional interface APIs for each different type of Patch Notification server 101 that is supported. Once a particular patch has been applied to a particular VM, the PAE 124 can use the first interface APIs 121 to notify the Patch Notification server 101 that the corresponding VM 104 has been updated with the corresponding patch. However, if the patching policy in the database 125 indicates that the patch should not be applied, the PAE 124 can use the first interface APIs 121 to notify the Patch Notification server 101 that the patch will not be applied or will not be applied to a particular VM. The Patch Notification server 101 can then update its own database (e.g., mark a patch as closed, updated, or not applicable).

The second interface APIs 122 enables the PAE 124 to interface with the Change Management Server 102 to open a change request (CR) for the patch, update the change request, or open or close an instant record (IR) for the patch. The open IR indicates that installation of the patch failed. If the patch is later re-installed successfully, the open IR can be closed by the PAE 124. The PAE 124 may include additional second interface APIs 122 for supporting different types of Change Management Servers.

The third interface APIs 123 enable the PAE 124 to interface with the Patching Server 103 to direct that a particular patch be applied to a particular VM 104 based on the patching policy stored in the database 125. The Patching Server 103 may have its own proprietary scripts or messages (e.g., fixlets), which a local user would use for testing applicability of a patch or directing application of the patch to one or more computers or VMs at particular times. The PAE 124 is configured to generate these proprietary scripts or messages to be sent to the Patching Server 103 using the third interface APIs 123. The PAE 124 may include additional third interface APIs 123 for supporting different types of Patching Servers.

The APIs discussed above may include Platform APIs and Simple Object Access Protocol SOAP APIs. In an embodiment, the Patching Server 103 uses a centralized management infrastructure for managing patches, endpoints, subscriptions, and scheduling and performing actions. Patches are distributed to endpoints in a hierarchical broadcast network, where caching servers (relays) are placed at strategic locations to reduce network traffic. These relays may also used to duplicate data sent back from endpoints to a central server to minimize reverse traffic.

When the Patching Server 103 is the TEM, it uses fixlets, which is a scripting language that describes various actions to apply a patch (e.g., checking the relevancy of a patch to an endpoint, downloading the patch from an URL, performing a checksum of the downloaded patch, applying the patch etc.). A fixlet can determine whether a computer or VM needs a patch. A single fixlet can be used to handle more than one patch and typically has a size of a few kilobytes.

The Patching Server 103 (TEM) may have a site for each different operating system (e.g., Windows, Linuz, Red Hat, AIX) where VMs can be subscribed to the sites based on OS type. When a vendor releases a patch, a patching script (e.g., a fixlet) can be created for that patch and put in a site on a patching server (e.g., fixlet server). The Patching Server 103 may be configured to push the patching script to all the endpoints (e.g., VMs) subscribing to the site, which evaluate the patching script and report the result to the Patching server 103.

The Patching server 103 provides Platform and SOAP APIs. The SOAP APIs are mainly used to read data from the Patching server 103, but to perform any action (e.g., schedule a patching script to an endpoint), the Platform APIs are used. The Platform APIs may be provided via a client-side DLL library on a Windows platform.

FIG. 2 shows an example of a patch management policy for a particular customer (e.g., "customerX"). As an example, the patch management policy is represented by tables 201, 202, and 203, which may be stored in database 125. While FIG. 2 shows the information being stored within three separate tables, this is merely for convenience of illustration and the below discussion, as this information may be stored in a single or a lesser number of tables.

The first table 201 lists a different patch window for the customer for each different level of patch severity. For example, patch severity levels of low, medium, and high are listed. However, embodiments of the invention are not limited thereto, as additional levels may be present such as critical, urgent, etc. The patch window indicates when the patch should be applied and how frequently. For example, as shown in table 201, patches of low severity are applied at the last Sunday of every quarter (e.g., last Sunday of March, June, September, and December) at 9 pm. However, the format of the patch window is not limited to any particular time/date format or application frequency.

In a further exemplary embodiment of the invention, one or more of the virtual machines 104 includes a watermark that classifies how the VM is being used. For example, one of the VMs 104 could be used for development of a program to sell airline tickets (e.g., a development system), another one of the VMs 104 could be used for testing the program to sell airline tickets (e.g., a testing system), and a third one of the VMs 104 could be used by a customer to run the program to actually sell the airline tickets (e.g., a production system). In an embodiment, the watermark is a computer file stored in a particular directory on each VM that includes a designator that indicates the category or purpose of the VM. For example, the designator could be a textual field such as "test" to indicate a VM is to be used for testing, "dev" to indicate that the VM is to be used for development, and "prod" to indicate the VM is to be used in a production environment. However, embodiments of the invention are not limited any particular number of designators or type of designation. For example, there may be additional designators and different text or other symbols may be used to indicate the same category or purpose. Further, the watermark could be a binary file, where the designator is binary data. In another embodiment, the watermark is stored within a relational database of the VM.

The watermarks allow the PAE 124 to adjust the patch window of a particular customer for a particular VM using pre-defined offsets associated with the category of that VM. The second table 202 of FIG. 2 illustrates an example of a table that stores the offsets. For example, for each different designation (e.g., test, dev, prod) of the customer (e.g., "customerX"), a different time offset is listed (e.g., +0 day, +1 week, +2 weeks). However, embodiments of the invention are not limited to any particular offset period and two or more designations can have the same offset. For example, referring to FIG. 2, if a high-level patch is available for a VM designated as a production system, it will be applied 2 weeks after the last Saturday of a month at 11 pm since the second table 202 lists the offset as +2 week.

Figure 3B:
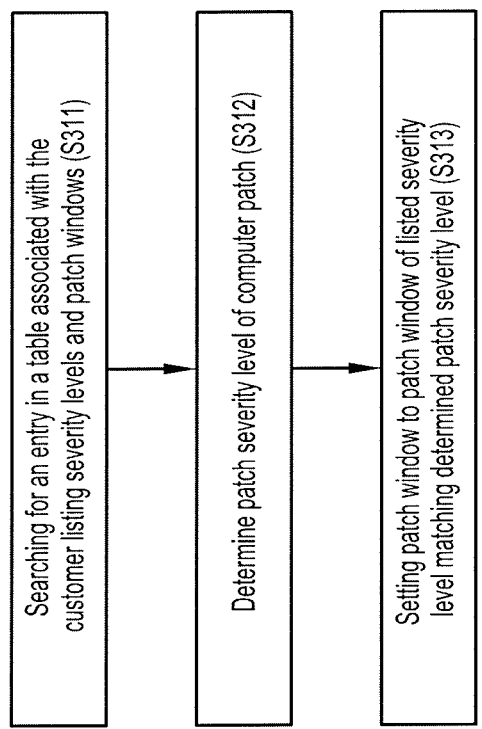
FIGS. 3B and 3C illustrate methods of determining a patch window of a patch policy for the patch according to exemplary embodiments of the invention.
Figure 3C:
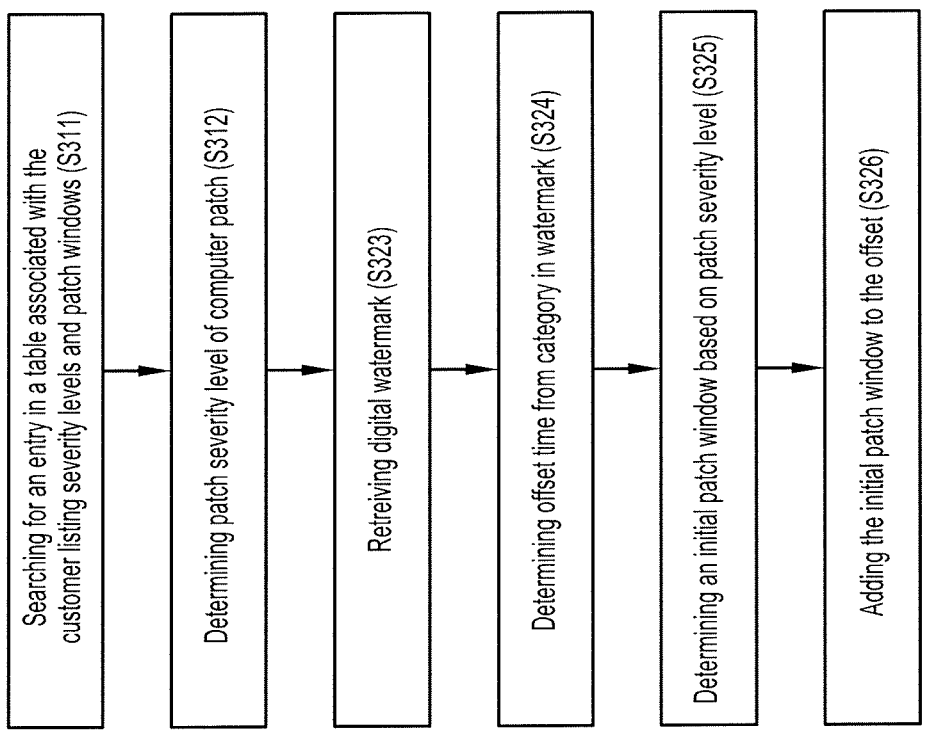

FIG. 3A, FIG. 3B, and FIG. 3C illustrate methods for applying a patch to a computer system or a VM according to exemplary embodiments of the invention.

Referring to FIG. 3A, the method includes determining whether a patch is available for a machine of a customer (S301). The PAE 124 performs this determination by using the first interface APIs 121 to inquire with the Patch Notification Server 101 to determine whether a patch is available for a VM that will be provisioned to the customer. The method further includes determining a patch management policy for the customer (S302). FIG. 2 lists the patch management policy of a single customer customerX. However, the PAE 124 can store the patch management policies of a multitude of customers. Accordingly, the tables shown in FIG. 2 would have additional entries for each different customer that is being managed. The patch management policy of a customer can be determined by querying for the patch management policy records associated with the customer. The method further includes determining a patch window based on the determined patching policy (S303). Then the PAE 124 can direct the Patching Server 103 to apply the patch at the determined patch window (S304).

FIG. 3B illustrates a method that may be used to determine the patch window according to an exemplary embodiment of the invention. Referring to FIG. 3B, the method includes searching for an entry in a table associated with the customer that lists patch severity levels and corresponding patch windows (S311), determining a patch severity level of the computer patch (S312), and setting the patch window of the customer to the patch window of the listed patch severity level that matches the determined patch level (S313). For example, the table may correspond to the first table 201 in FIG. 2, where the patch severity levels are low, medium, high, and the listed patch windows are shown in the last column of the first table 201.

FIG. 3C illustrates a variation on the method of FIG. 3B, where in addition to patch severity, the category of the computer or VM is additionally used to determine the patching window. For example, the method of FIG. 3C, includes the same first two steps as that of FIG. 3B. Further, the method of FIG. 3C includes retrieving a digital watermark from the computer system or VM (S323). The PAE 124 can retrieve the watermarks from a VM by using the third interface APIs 123 that interfaces with the Patching Server 103. For example, the Patching server 103 can request the watermark from the VMs 104 as needed. In another embodiment, the PAE 124 reads the watermarks from the VMs 104 directly without involving the Patching Server 103. The method further includes determining a patch offset time based on a category within the retrieved digital watermark (S324). For example, as shown in FIG. 2, the patch offset time for a particular customer can be retrieved by finding a category in the second table 202 for the customer that matches the category in the watermark and extracting its corresponding offset. The method further includes determining an initial patch window based on the patch severity level (S325). For example, the initial patch window can be determined by finding a severity level in the first table 201 for the customer that matches the severity level of the patch and extracting its corresponding patch window. The method further includes adding the patch offset time to the initial patch window to generate the patch window for the customer (S326).

Since unique patch policies can be stored for each customer, the PAE 124 may need provisioning information, such as to which customer each VM is provisioned to or will be provisioned to. The identity of the customer can then be used as an index to the corresponding patching policy. The PAE 124 may have pre-defined provisioning information or it may query the Provisioning Manager (106) for this information using additional application programming interfaces (not shown).

The PAE user interface 126 may be used to enter the patching policy data for each customer. For example, the user interface 126 may be a graphical user interface that enables a user to enter patch windows for each patch severity level, patch offsets for each category, and exceptions to be made so that certain patches can be excluded.

For example, the third table 203 is an example of a list of patches that will not be applied to a computer or VM of a particular customer. For example, FIG. 2 illustrates an example where customer "customerX" has indicated that patch "MS10-081" should not be applied. Thus, when the PAE 124 checks the Patch Notification Server 101 and determines that patch "MS10-081 is available, it will not apply the patch to computers or VMs provisioned to customer "customerX". Further, the PAE 124 may notify the Patch Notification Server 101 that the patch will not be applied so the Patch Notification Server 101 can close any open records it has on the corresponding patch.

The PAE 124 is capable of streamlining the end-to-end patch management process due to its integration with various management tools, mimicking how a human operator would use these tools to carry out various tasks. The patch automation system 120 includes various interface functions/libraries (see e.g., 121-123) to integrate the PAE 124 with these tools. The interface functions are defined such that when a tool (e.g., the Patch Notification Server 101, the Change Management Server 102, etc.) is changed (e.g., replaced with a similar tool or that of another manufacturer), only the interface functions (e.g., 121-123) need to be replaced. This plug-and-play capability allows the PAE 124 to be re-used in other environments with limited changes.

Figure 4:
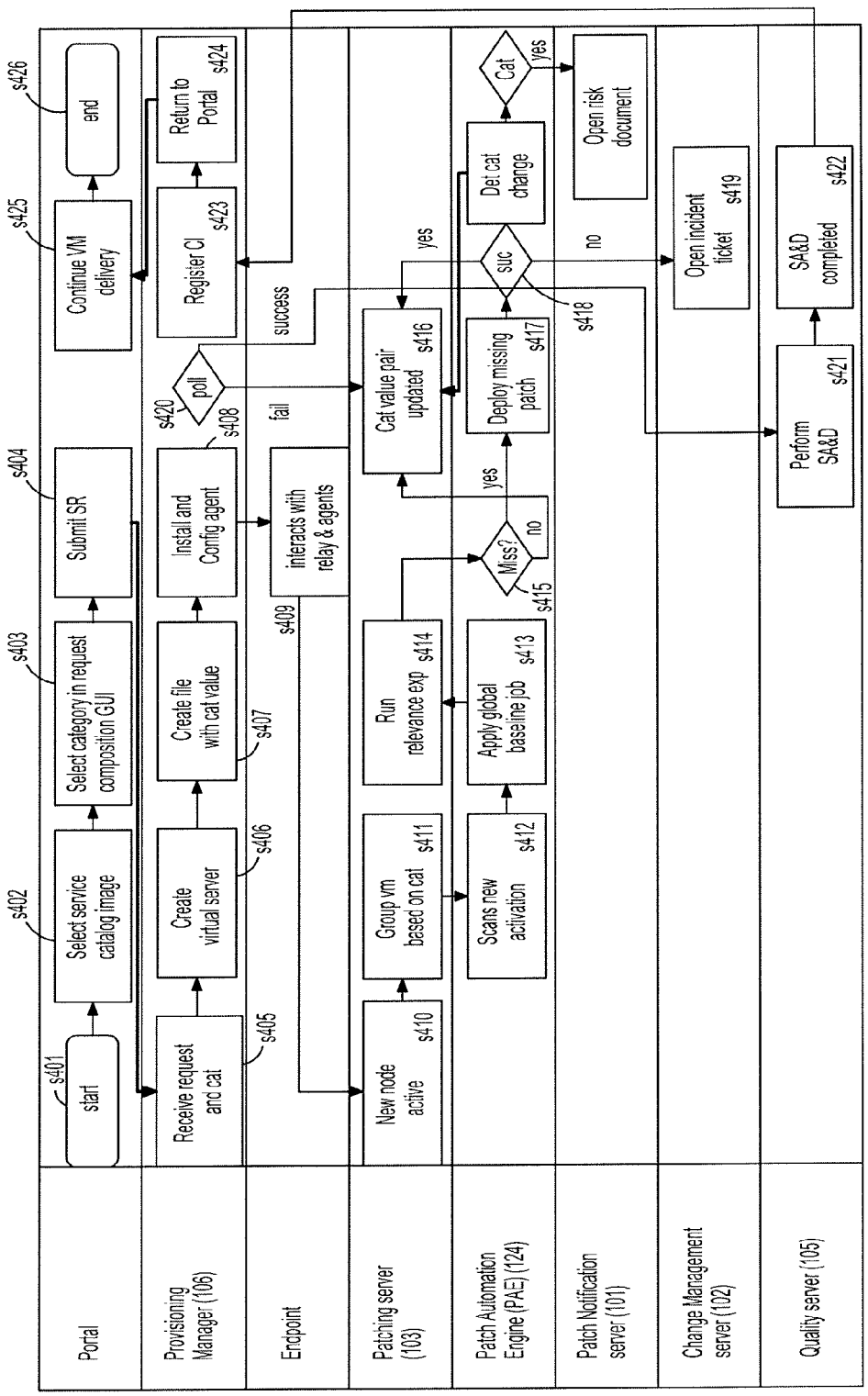
FIG. 4 illustrates an exemplary flow diagram showing an interaction between a Patch Automation Engine of the system and other modules, according to an exemplary embodiment of the invention.

FIG. 4 is an exemplary flow diagram showing interactions between modules and the PAE 124. Referring to FIG. 4, the flow diagram begins at a starting point (S401), continues to a Portal selecting a service catalog image (S402), to the Portal selecting a category in a request composition (S403), and then to submission of a service request by the Portal (S404).

Next, the flow diagram includes the Provisioning Manager 106 receiving the request and categorization from the Portal (S405), creating a virtual server (S406), creating a property file include a category value (S407), and installation and configuration of an agent using the property file (S408).

Next, the flow diagram includes the agent interacting with the Patching server 103 via a relay server in an endpoint (S409), the Patching server 103 activating a new node (S410) and grouping a VM based on the category value pair (S411).

Next the flow diagram continues with the PAE 124 scanning for activation of a new patch (S412) and applying any global baseline jobs to the Patching server 103 (S413). Next, the flow diagram continues to the Patching server 103 running a relevance expression to respond to the PAE (S414).

Next, the flow diagram continues to the PAE 124 determining whether a patch is applicable and missing (S415). If the patch is not missing, the flow continues to the Patching server 103 updating the category value pair (S416).

If the patch is missing, the flow continues to the PAE 124 deploying the missing patch (S417), and then the PAE 124 determining whether patch deployment has been successful (S418).

If the patch deployment is successful, then the Patching server 103 updates the category value pair. If the patch deployment is not successful, the flow diagram continues to the Change Management server 102 opening a corresponding incident ticket (S419).

The Provisioning Manage (106) may periodically perform a polling operation of the Quality Server 105 to determine whether the patch has been applied properly (S420). The polling causes the Quality server 105 performs quality testing of the patches application (S421), and when the testing has completed (S422), the Quality server 105 notifies the Provisioning Manager 106.

In response to the notification, the Provisioning Manager 106 registers a change incident (S423) and then notifies the Portal (S424). In response to the notification, the Portal delivers the patched VM to the corresponding customer (S425), and then the flow may end (S426) or re-start (S401).

Figure 5:
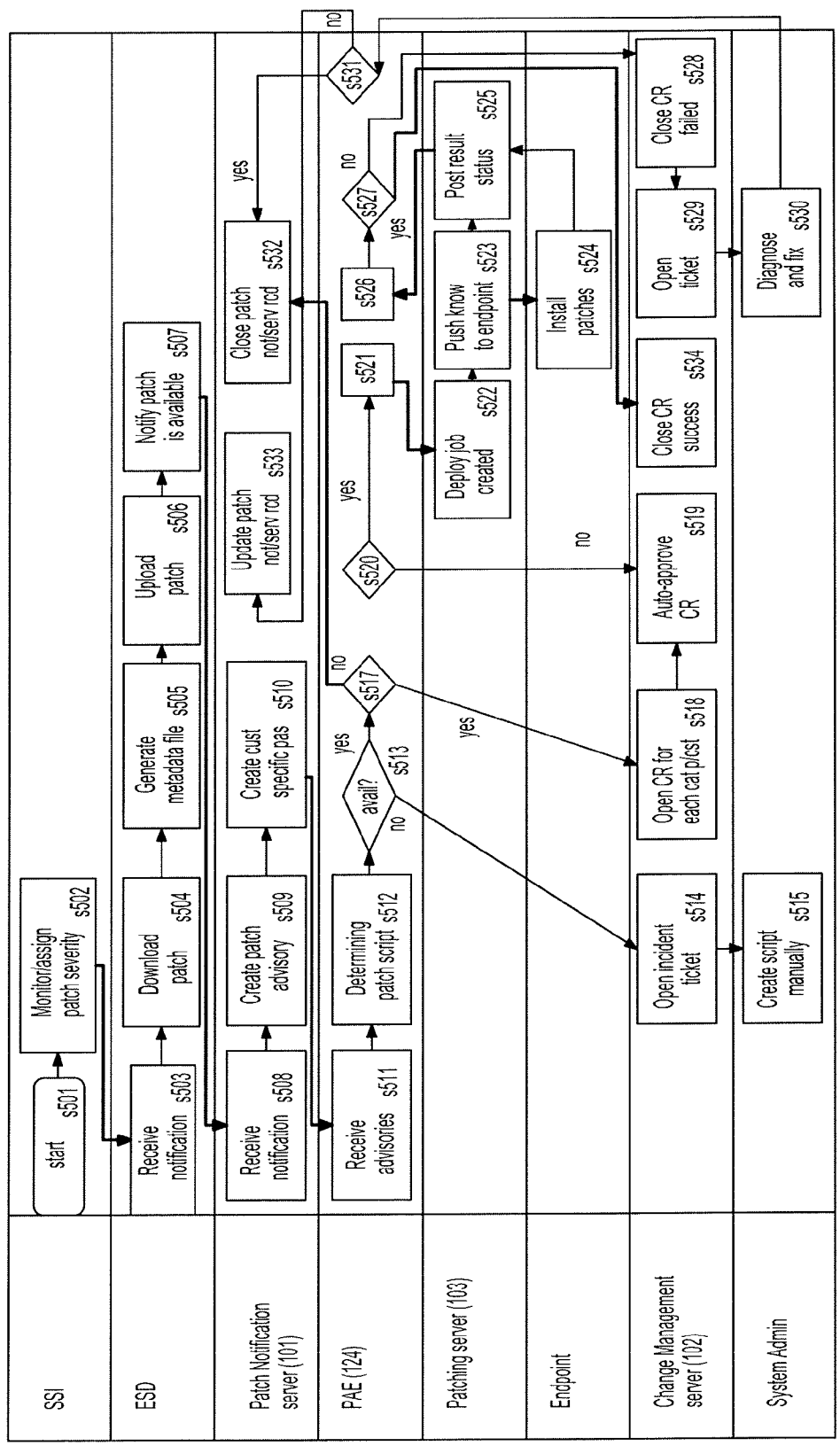
FIG. 5 illustrates another exemplary flow diagram showing an interaction between the Patch Automation Engine and other modules, according to an exemplary embodiment of the invention.

FIG. 5 is an exemplary flow diagram showing interactions between modules and the PAE 124. Referring to FIG. 5, the flow diagram begins at a starting point (S501), continues to a first program (e.g., a standard software installer) monitoring and assigning a patch severity level (e.g., low, medium, etc.) to a particular patch and providing a notification of such (S502).

Next, the flow diagram continues with a second program (e.g., an electronic software distribution program) receiving the notification (S503), the second program downloading the patch (S504), the second program generating a metadata file with the patch severity level for the patch and the customer (S505), the second program uploading the patch to a VM or computer it is to be applied (S506), and the second program notifying the Patch Notification server 101 that the patch is available (S507).

Further, the flow diagram continues with the Patch Notification server 101 receiving the notification (S508), creating a master patch advisory (S509), and generating customer specific patch advisories from the master for application to the PAE 124 (S510).

Further, the flow diagram continues with the PAE 124 receiving the customer specific patch advisories (S511), determining a patching script (e.g., fixlet) that matches the patch advisory and is suitable for the Patching server 103 (S512). If the PAE 124 determines that the patching script is not available, it sends a message to the Change Management server 102 indicating that the patching script is not available. The flow diagram further includes the Change Management server 102 opening an incident ticket in response to receiving the message (S514). The Change Management server 102 may notify another party (e.g., a system administrator) of the incident (e.g., through an email), and then the party can create the patching script manually (S515).

If the patching script was available, the flow diagram continues with the PAE 124 determining applicability of the patch (S517). If the patch does apply, the PAE 124 can notify the Change Management server 102 of such (e.g., with a message), and then the Change Management server 102 can open a change request for each patch category per customer (S518) and then automatically approve each change request (S519).

If the patch does not apply, the PAE 124 can notify the Patch Notification server 101 of such (e.g., with a message), and then the Patch Notification server 101 can close the patch record (S532).

If the change request is determined to be approved by the PAE 124 (S520), the PAE 124 initiates creation of a deployment job for the patch with an agreed schedule (e.g., based on a patch policy of the customer) on the Patching server 103 (S521).

The Patching server 103 then creates the job (S522), the created job pushes knowledge about the patch to the end-point (S523), and then the end-point installs the required patches (S524) and posts results of the installation (e.g., in a message) to the PAE 124 (S525).

The PAE 125 evaluates the status of the deployed job based on the posted results (S526) and then determines whether the job was successful (S527). The PAE 124 reports whether the job was successful or not to the Change Management server 102 in response to the determination.

If the job was not successful, the Change Management server 102 closes the change request as failed (S528) and opens a corresponding incident ticket (S529), which can then be diagnosed and fixed by another party (e.g., a system administrator) (S530). For example, a system administrator could manually apply the patch and notify the PAE 124 through the user interface 126 that the patch was applied successfully.

The PAE 124 can then determine whether all categories of patches have completed (S531) and then direct the Patch Notification server 101 accordingly. If all the categories were completed, the Patch Notification server 101 can close its record associated with the patches (S532). If not all the categories were completed, the Patch Notification server 101 can update the record accordingly (S533). If the job was successful, the Change Management server 102 closes the change request as successful in response to receiving the successful report (S534).

In an embodiment, the PAE 124 is configured to detect whether one of the virtual machines (104) has been suspended and then to automatically update the suspended virtual machine to the latest patch level. Further, the PAE 124 is configured to restore a virtual machine back to an earlier snapshot. Before applying a patch to machine, the PAE 124 can determine the patch levels of all existing patches on the machine. Thus, if application of a patch to a particular component has caused a problem, the PAE 124 can direct the re-installation of the prior patches for that component.

Figure 6:
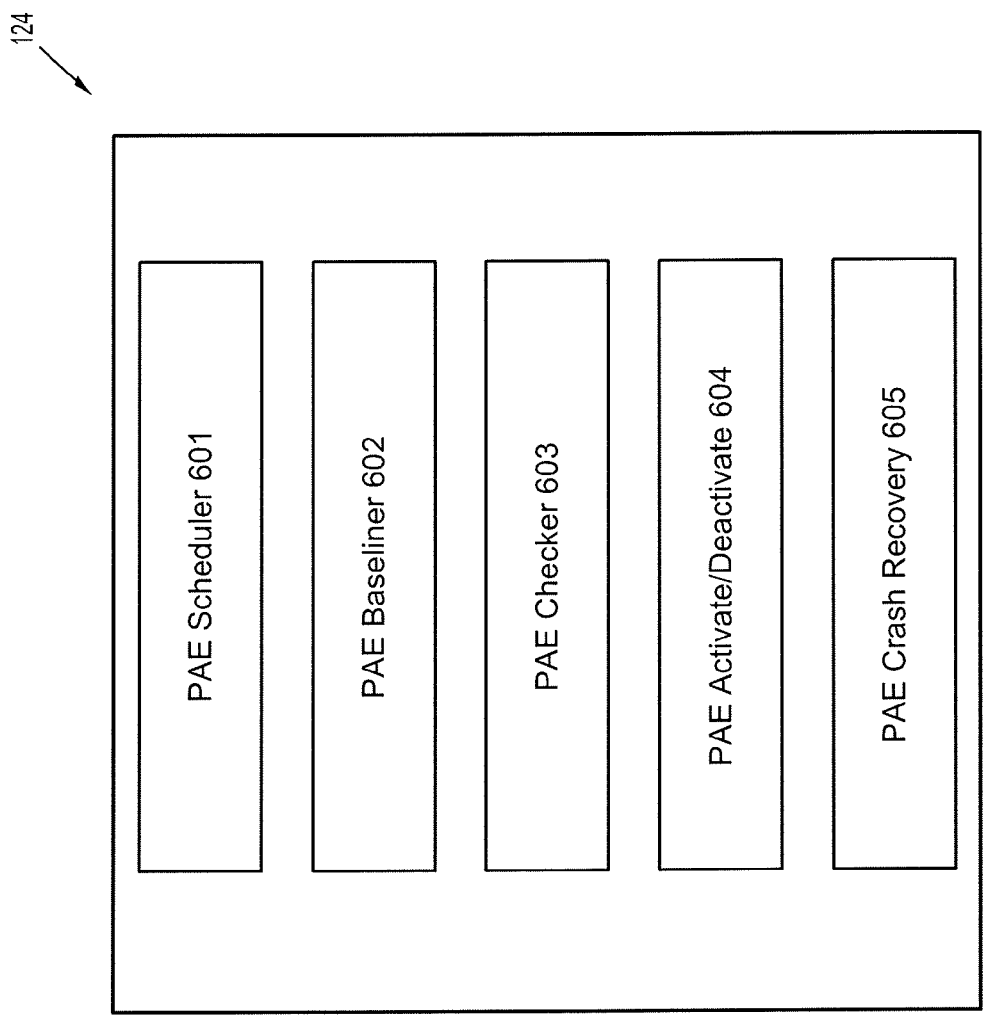
FIG. 6 illustrates parts of a Patch Automation Engine according to an exemplary embodiment of the invention.

FIG. 6 illustrates components of the PAE 124 according to an exemplary embodiment of the invention. Referring to FIG. 6 the PAE 124 includes a PAE Scheduler 601, a PAE Baseliner 602, a PAE Checker 603, a PAE Activation/Deactivation Module 604, and a PAE Crash Recovery Module 605.

The Scheduler 601, Baseline 602, and the Checker 603 perform steady-state operations. For example, when VMs are up-to-date to the latest patch level, they need to be kept up-to-date without causing compliance issues.

The activation/deactivation module 604 performs one-time operations. For example, when VMs are provisioned, they might not be patched to the latest patch level. Therefore, one-time adjustments may need to be made before handing these VMs to customers.

Figure 10:
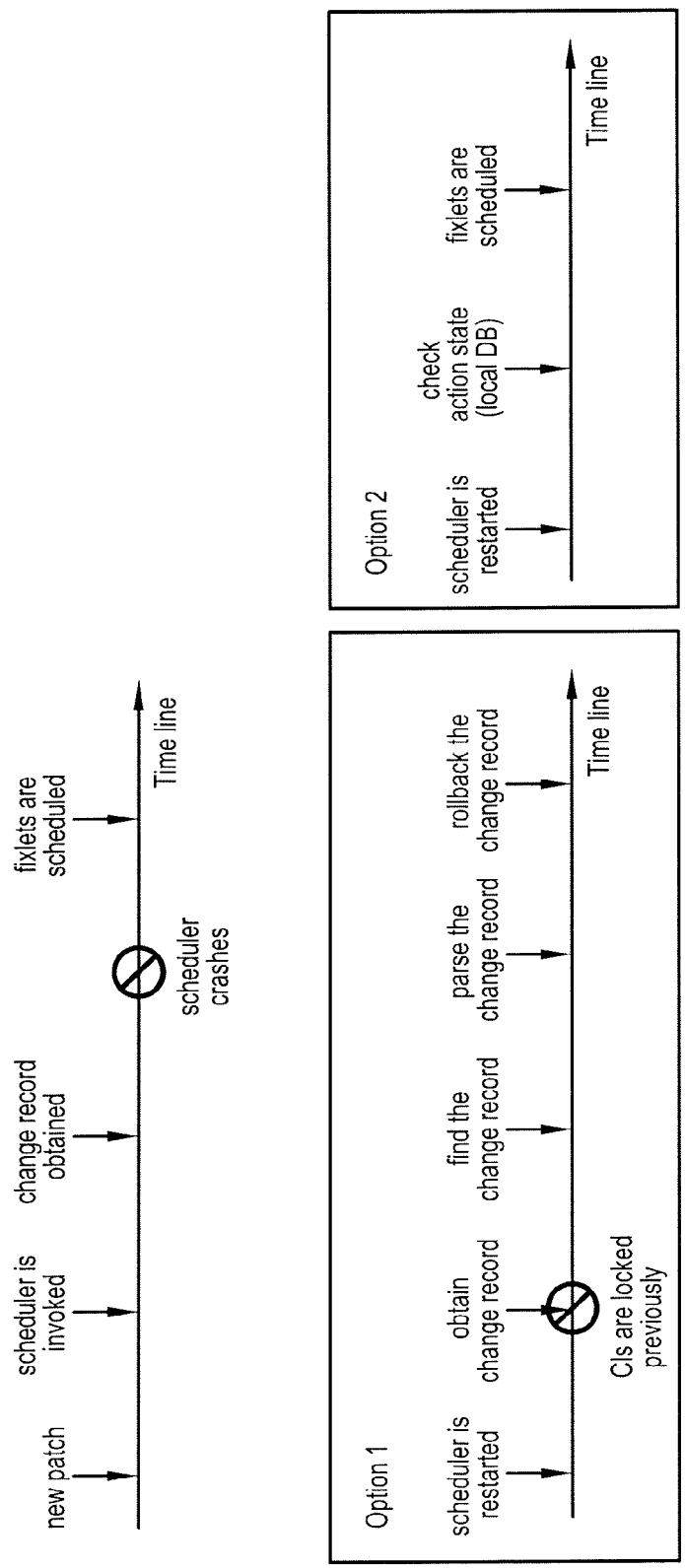
FIG. 10 illustrates an exemplary process flow for a fourth one of the parts of the Patch Automation Engine.

FIG. 10 illustrates an exemplary process flow for the Crash Recovery Module 605, which performs fault-tolerance support. For example, external servers and the PAE 124 can crash and malfunction. Accordingly, the Crash Recovery Module 605 allows the PAE 124 to continue to operate correctly despite transient behaviors. The Crash Recovery Module 605 keeps state information about each patch as it goes through the steps in the patch management process. In case of a crash, the Crash Recovery Module (605) can clean up the state and pick up from when crash happened.

Examples of one-time operations are VM provisioning and de-provisioning. When a VM is provisioned, it needs to have the latest patches applied before being handed to the customer. Otherwise, the VM can be vulnerable from the start.

Figure 9:
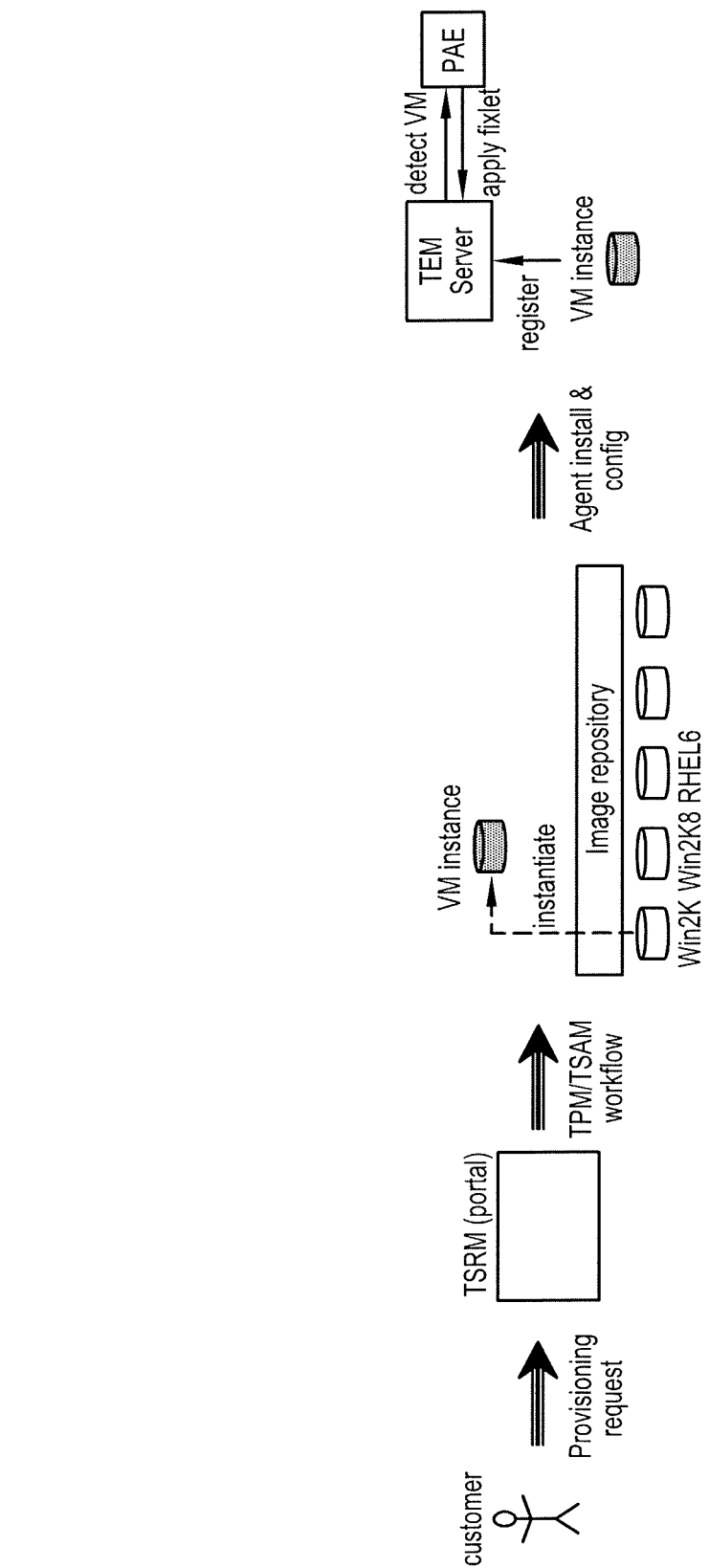
FIG. 9 illustrates an exemplary process flow for a third one of the parts of the Patch Automation Engine, according to an exemplary embodiment of the invention.

FIG. 9 illustrates an example of a process flow for the PAE Activation/Deactivation Module 604. The Activation/Deactivation Module 604 is responsible for detecting newly provisioned VMs and applying the latest baseline to them.

For steady-state operations to keep VMs always in a compliant state, the Scheduler 603 detects newly released patches (e.g., through interface with the Patch Notification server 101), opens the necessary change tickets (e.g., through interface with Change Management Server 102), and once the tickets are approved, it schedules the patches onto the relevant VMs during an acceptable window (e.g., through interface with the Patching Server 103).

Figure 7:
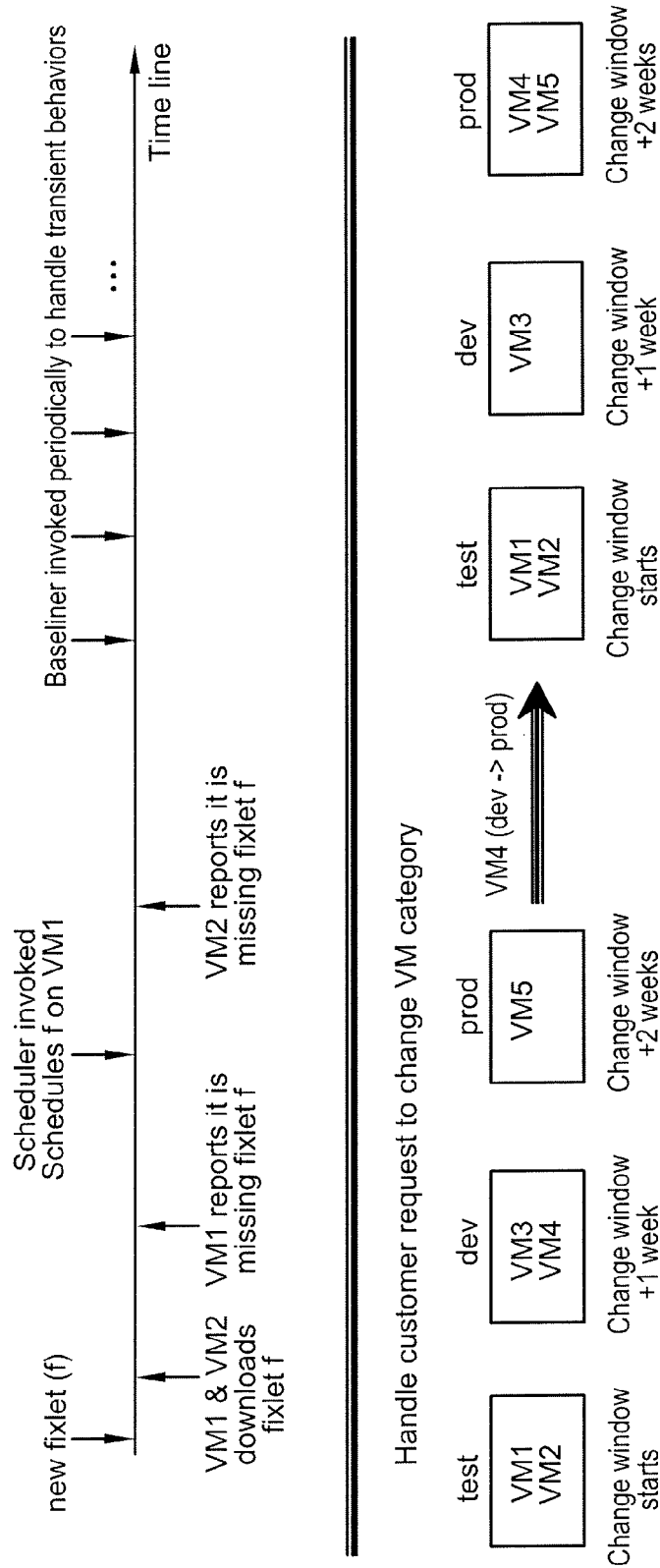
FIG. 7 illustrates an exemplary process flow for one of the parts of the Patch Automation Engine, according to an exemplary embodiment of the invention.

However, things can change dynamically in a large managed environment. For example, as shown in FIG. 7, a customer can change the category of a VM from development to production. If there are already change records opened against this VM and patches were scheduled, these actions need to be rolled back and rescheduled accordingly without disturbing existing actions. The Baseliner 602 can be invoked periodically by the PAE 124 to deal with these dynamic aspects.

Figure 8:
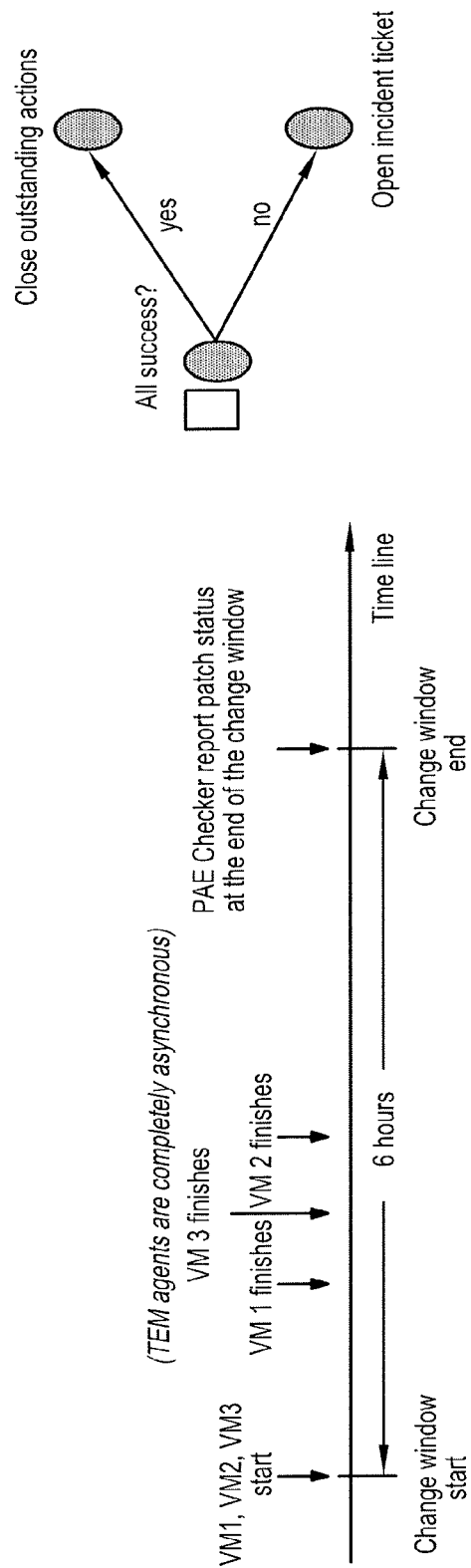
FIG. 8 illustrates an exemplary process flow for a second one of the parts of the Patch Automation Engine, according to an exemplary embodiment of the invention.

FIG. 8 illustrates an example of a process flow of the Checker 603. When patches are applied during change windows, the Checker 603 detects whether the patches have been applied successfully. If so, change records are closed and evidence is collected for audit purposes. However, if a patch has failed, the Checker 603 opens an incident ticket to alert system administrators so that the problem can be resolved within an allowable time frame. The Checker 603 reports patch status at the end of the change window. However, in an alternate embodiment, the Checker 603 uses only a portion of the total change window (e.g., 2 out of 6 hours) to report patch status.

According to an exemplary embodiment of the invention, an automated patch management system includes a patch severity determination process and a customer specific implementation process. The patch severity determination process categorizes one or more proposed patches. The customer specific implementation process determines when to implement one of the patches based on the respective patch severity and one or more customer specification (e.g., patch policies).

The patch severity determination process may categorize the patch by marking or designating the patch as being one of types such as a security patch, a functional patch, and a performance patch. The marking could be performed by creating metadata indicate the type and then linking the metadata to the patch. For example, an entry could be added to database 125 that includes the name of the patch, the type, and a customer identifier. The customer specification may include timing of when to apply patches in a specific time/date duration.

In a further embodiment, the automated patch management system may further include a VM classification process that determines a function classification of one or more VMs in a set of VMs. The function classification has one or more work flow characteristics. The customer specific implementation process may be further configured to determine on which VM the respective patch is implemented.

The function classification may be one of a production classification, a development classification, and a test classification. The VM classification process may perform its determination based on examining the digital watermarks described above.

The time in which a patch is applied by the automated patch management system to one of the VMs may be determined by one or more of a customer specification (e.g., a contract specification) or a system specification (e.g., list of computers and operating systems used by customer). The implementation of the respective patch may be stage across VMs depending on its classification.

The patch automation system may further include an exception process that determines one or more reasons to delay or prevent implementation of one or more of the patches. The customer implementation process may delay or prevent implementation of one or more of the patches that the exception process identifies.

The patch automation system may include APIs to gather information from external servers or processes, such as patch notifications, open change requests, and patch status, and to create patch schedules, and direct application of patches.

The patch automation system is configured to operate in a fully automated manner. For example, the patch automation system can perform functions such as patch notification, change/incident management, patching, and post-patching health checks automatically without user intervention or feedback. However, in alternate embodiments, the patch automation system operates in a semi-automatic mode or can be switched from an automatic mode into the semi-automatic mode. For example, the patch automation system can be configured to only automate the tasks of a particular group of modules and exclude others from automation. For example, the patch automation system can be configured to automate the tasks of the Patch Notification Server 101 and the Change Management Server 102, without automating the tasks of the Patching server 103. Further, the patch automation system can work in concert with manual controllers. For example, if a user manually opens a change record on the Change Management server 102 for the installation of a patch by a human installer, the patch automation system can omit the patch from its automatic update. The user interface of the patch automation may enable a user to select which modules or functions to be automated and which modules or functions to be excluded.

Figure 11:
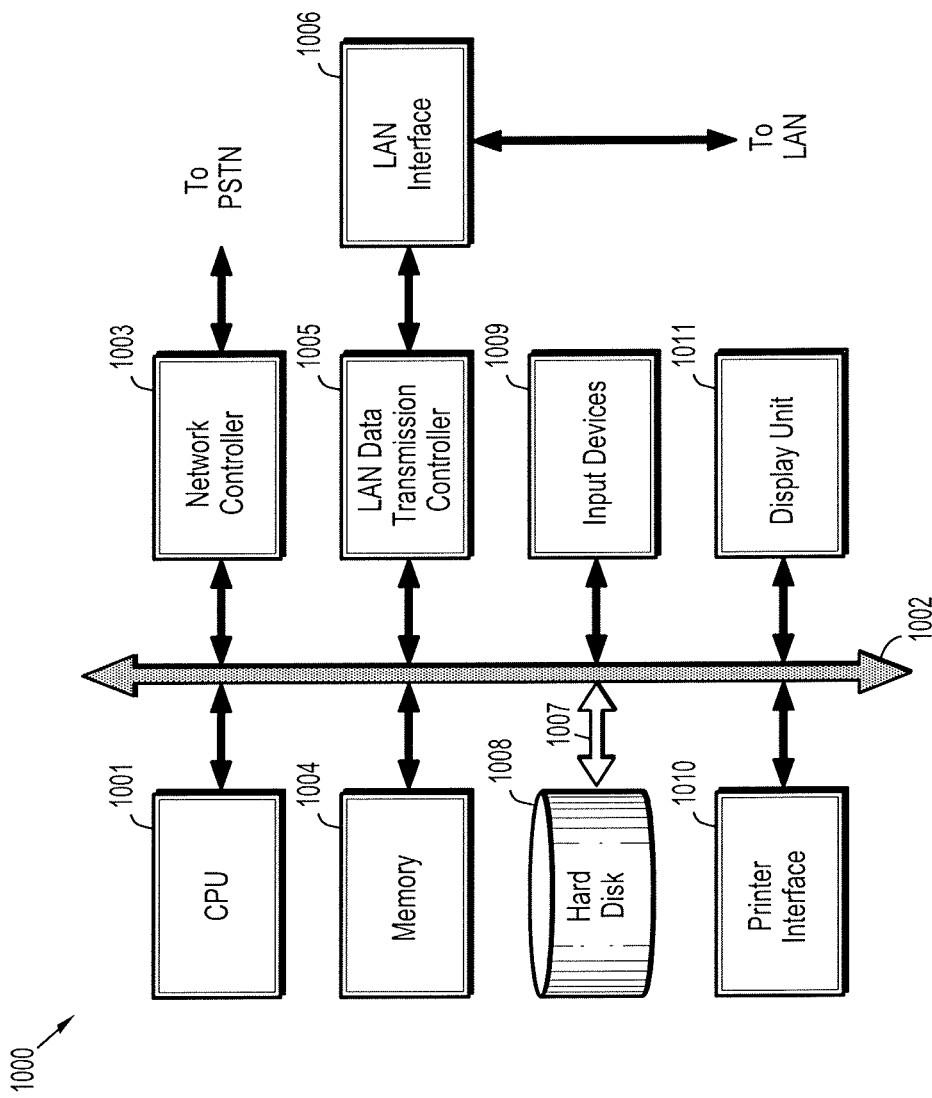
FIG. 11 illustrates an example of a computer system capable of implementing methods and systems according to embodiments of the disclosure.

FIG. 11 illustrates an example of a computer system, which may execute any of the above-described methods, according to exemplary embodiments of the invention. For example, the methods of FIG. 3A-3C and the flow diagrams of FIG. 4 and FIG. 5 may be implemented in the form of a software application running on the computer system. For example, the computer system may house the Patch Automation System 120, the Patch Notification server 101, the Change Management server 102, the Patching server 103, the Quality server 105, the Provisioning Manager 106, or the Service Request manager 107. Further, the Virtual Machines 104 may be run on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. The display unit 1011 may be used to display the user interface (126) of the PAE (124). As shown, the system 1000 may be connected to a data storage device, for example, a hard disk 1008, via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of automating patching of a computer system, the method comprising:
   determining, by a local computer remote from the computer system, whether a computer patch is available for a computer system of a customer;
   determining, by the local computer, a patch management policy of the customer;
   retrieving, by the local computer, a computer file from the computer system including a category representing a purpose for which the computer system is used;
   searching, by the local computer, for an entry in a table associated with the customer that lists a plurality of different categories and corresponding patch offset times;
   setting, by the local computer, a patch offset time to the listed patch offset time whose category matches the category in the retrieved file;
   determining, by the local computer, a patch window of the customer based on the determined patch management policy and the patch offset time; and
   directing, by the local computer, application of the computer patch to the computer system at the determined patch window.

2. The method of claim 1, wherein the categories include a development category indicating the purpose of a computer system is development, a testing category indicating the purpose of a computer system is testing, and a production category indicating the purpose of a computer system is production.

3. The method of claim 1, wherein determining whether the computer patch is available comprises using a local interface application programming interface to query an external patch notification server to determine whether the computer patch is available for the customer.

4. The method of claim 1, wherein directing application of the patch comprises:
   instructing an external change management system to open a change request for the customer for applying the computer patch; and
   notifying the change management system that the request was approved.

5. The method of claim 1, further comprising using a local interface application programming interface to notify an external change management system that the computer patch has been applied successfully or a failure occurred in the application of the computer patch.

6. The method of claim 1, wherein the directing application of the computer patch comprises:
   generating a patch script that is compatible with an external patching server based on the computer patch; and sending the patch script to the patch server using a local interface application programming interface that is compatible with the patching server.

7. The method of claim 1, wherein determining whether the computer patch is available for the computer system comprises:

searching for an entry in a table associated with the customer that lists patches to ignore;

determining a name of a computer patch that is available for application; and determining the computer patch is available for the computer system if the name does not match names of the listed patches.

8. The method of claim 1, wherein the computer system is a virtual machine.

9. A computer program product for, the computer program product comprising:

a non-transitory computer readable storage medium having computer readable program code embodied therewith, the computer readable program, code comprising:

computer readable program code configured to operate on a local computer remote from a computer system of a customer, determine whether a computer patch is available for the computer system of the customer, determine a patch management policy of the customer, determine a patch window of the customer based on the determined patch management policy and a patch offset time, and direct application of the computer patch to the computer system at the determined patch window, wherein the program code determines the patch offset time by retrieving a computer file from the computer system including a category representing a purpose for which the computer system is used, searching for an entry in a table associated with the customer that lists a plurality of different categories and corresponding patch offset times, and setting the patch offset time to the listed patch offset time whose category matches the category in the retrieved file.

10. A computer system to provide automated patching, the system comprising:

a processor;

a memory, wherein the memory stores an interface application programming interface, a patching automation program, and at least one customer patching policy, wherein the interface application programming interface includes first interface routines to communicate with an external patch notification server and second interface routines to communicate with an external patching server, and wherein the patching automation program uses the first interface routines to determine whether a patch is available for a computer of a customer and the second interface routines to apply the patch to the computer at a patch window based on the customer patching policy of the customer and a patch offset time, wherein the computer system is remote from the computer of the customer, wherein the computer system retrieves a computer file from the computer of the customer including a category representing a purpose for which the computer system is used, searches or an entry in a table associated with the customer that lists a plurality of different categories and corresponding patch offset times, and sets the patch offset time to the listed patch offset time whose category matches the category in the retrieved file.

11. The computer system of claim 10, wherein the system is configured to perform at least one of functions of patch notification, change management, patching, and a post-patching health check in an automatic mode, and operate in a semi-automatic mode to exclude one of the functions performed during the automatic mode.

12. The computer system of claim 10, wherein the customer patching policy indicates that patches are to be applied to computers of the customer at different patching windows based on a severity level of the patch.

13. The computer system of claim 10, wherein the interface application programming interface includes third interface routines to communicate with an external change management server.

14. The computer system of claim 10, further comprising a provisioning manager that is configured to enable a user to store the file as a digital watermark on one of a plurality of computer systems, wherein the digital watermark includes the category.

15. The computer system of claim 14, wherein the provisioning manager is configured to enable the user to set the category to indicate that the corresponding computer system is to be used for one of testing, development, and production.

16. The computer system of claim 10, wherein the memory stores a relational database and the patching policy for a customer is represented by at least one table of the database formatted to include at least a first entry with a customer identifier of the customer, a first patch category, and a first patch window, and a second entry with the customer identifier, a second other patch category, and a second other patch window.

17. The computer system of claim 16, wherein the patch categories represent different patch severity levels.

18. A method of applying a patch to one of a plurality of virtual machines, the method comprising:

determining, by a local computer, whether a computer patch is available for one of the virtual machines that is provisioned to a customer and remote from the local computer;

retrieving, by the local computer, a digital watermark from the one virtual machine including a category representing a purpose for which the one virtual machine is used;

determining, by the local computer, an initial patch window based on a patch severity of the computer patch;

determining, by the local computer, a patch offset time based on the category; and applying, by the local computer, the patch to the virtual machine at a patch window based on the initial patch window and the patch offset time, wherein the digital watermark is a computer file stored in a particular directory on the one virtual machine.

19. The method of claim 18, wherein determining whether computer patch is available comprises using a local interface application programming interface to query an external patch notification server to determine whether the computer patch is available for the virtual machine.

20. The method of claim 18, wherein applying the patch further comprises:

instructing an external change management system to open a change request for the customer for applying the computer patch; and notifying the change management system that the request was approved.

21. The method of claim 18, wherein applying the computer patch comprises:

generating a patch script that is compatible with an external patching server based on the computer patch; and sending the patch script to an external patch server using a local interface application programming interface that is compatible with the patching server.

22. The method of claim 18, wherein the determining of the patch offset time comprises:
searching for an entry in a table associated with the customer that lists a plurality of different categories and corresponding patch offset times; and
setting the patch offset time to the listed patch offset time whose category matches the category in the retrieved watermark.

23. The method of claim 22, wherein the categories include a development category indicating the purpose of a virtual machine is development, a testing category indicating the purpose of a virtual machine is testing, and a production category indicating the purpose of a virtual machine is production.

* * * * *